Dec. 22, 1925.  
G. TANZI  
1,566,705  
METHOD OF PRODUCING TWISTED MACARONI  
Original Filed June 13, 1922
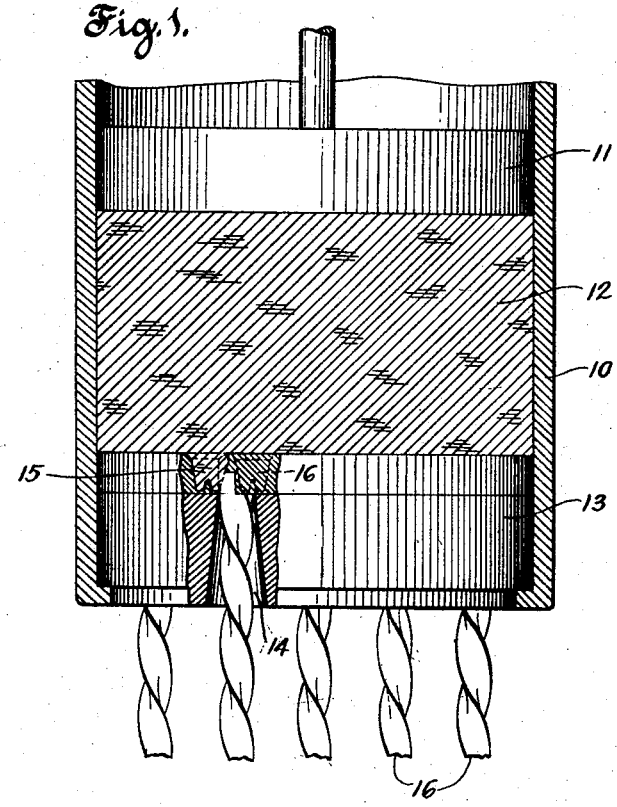
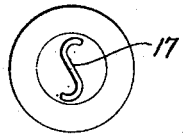 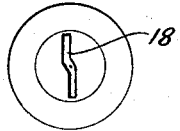 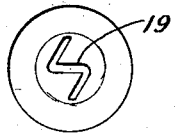 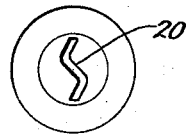
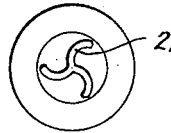 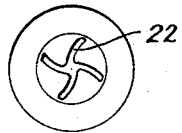 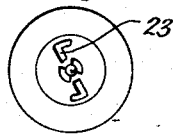 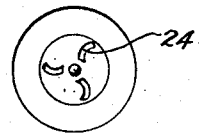
INVENTOR  
Guido Tanzi  
BY  
ATTORNEY Patented Dec. 22, 1925.

1,566,705

UNITED STATES PATENT OFFICE.

GUIDO TANZI, OF LONG ISLAND CITY, NEW YORK, ASSIGNOR TO F. MALDARI & BRO., OF NEW YORK, N. Y., A CORPORATION OF NEW YORK.

METHOD OF PRODUCING TWISTED MACARONI.

Application filed June 13, 1922, Serial No. 567,998. Renewed May 15, 1925.

*To all whom it may concern:*

Be it known that I, GUIDO TANZI, a subject of the King of Italy, and resident of Long Island City, county of Queens, State of New York, have invented certain new and useful Improvements in Methods of Producing Twisted Macaroni, of which the following is the specification.

This invention relates to the method of producing macaroni in the form of an extended spiral or otherwise.

It has long been the object of macaroni makers to so shape their product, that it would cook evenly and not mat or mass during the cooking, serving or eating. With this idea in mind, macaroni has been produced as hollow tubes, into which the cooking water could pass readily, the passage of the water making the cooking more uniform, but, nevertheless, massing of the long tubular members prevents the water readily reaching the interior, with a result that unless the water is kept actively boiling, the macaroni becomes a glutenous mass, unsatisfactory in looks and not particularly appealing to the taste.

Another objection to tubular macaroni is the difficulty in handling, while preserving the tubular form. The consistency of the dough mass must be very carefully considered and the moisture content must be always exactly the same to result in a uniform product and if the speed of the machine is increased in producing tubular macaroni, the walls of the tubes will be thinned out with a result that these walls will readily crush in handling and the macaroni become unfit for the market.

In the past, attempts have been made to produce macaroni in the form of a spiral. It has been discovered that in a spiral form, the macaroni has all of the advantages and none of the disadvantages of the tubular macaroni. It can be produced more rapidly, can be handled more readily, will cook more evenly and or far more appetizing in appearance and taste when served.

Mechanical means were employed for producing the spiral, which means meant the twisting of the macaroni as it was discharged from the forming die. Such a twist mechanically produced upon material such as the soft plastic mass of un-dried macaroni cannot be accomplished satisfactorily and it is to accomplish this twist, to produce the macaroni in the spiral form without the necessity of a mechanically imparted twist that I have constructed the device that I will now describe and while I have and will throughout this application refer to macaroni, it will be understood that spaghetti and all dough products of a similar nature may be similarly produced.

My device and its method of operation will be fully set forth as the specification progresses and the accompanying drawing should be referred to for a complete understanding of the specification which follows.

In the drawing:—

Fig. 1, is a sectional view of a pressure piston and cylinder, the macaroni die shown therein is partly in section.

Fig. 2 to Fig. 9, inclusive, show in plan view, the discharge orifice of the lower die plate.

Similar reference numerals indicate like parts in all the figures where they appear.

At 10, I show a cylinder and at 11 a piston operable therein and a mass 12 between the piston 11 and the die plate 13 is a plastic mass or dough. The die 13 may be made of two parts as shown and I call attention to the fact that while I have shown but five discharge orifices in this die as indicated at 14, the die may contain any number of discharge orifices that may be desired.

Arranged upon each discharge orifice 14 are a plurality of receiving orifices as indicated at 15 and 16 and there are two receiving orifices feeding into each discharge orifice.

The finished product emerging as shown at 16 will have a cross-sectional shape determined by the shaping or ejector passage through the bottom of the discharge orifice and while the cross-sectional outline of the material may be similar to any of the shapes shown from 17 to 24 or otherwise in Figs. 2 to 9 inclusive. The material as it leaves the die and regardless of its cross-sectional shape will be twisted into an extended spiral as shown.

The spiral which I consider important is produced by ejecting two flattened strips of dough, with their edges closely adjacent to each other, the ejecting orifices being arranged at an angle and closely adjacent at the point of ejection causing the edges of the strips to adhere one to the other and as the angle of the ejection orifices are of opposite inclination, the strips will tend to twist, the twist being made more positive by the bringing together of the edges in such a manner that they may cohere.

The construction of the die here employed is fully set forth in an application filed on even date herewith and the serial number of which is 567,997 (now Patent No. 1,461,504).

It will be understood that while modifications may be made, I prefer the whole as shown and described.

Having carefully and fully described my invention, what I claim and desire to obtain is:—

The method of producing spiral macaroni which consists in forming macaroni dough into thin strips, projecting said strips out of alignment and in close proximity to each other and retarding the flow of the edges of the strips, which are adjacent each other as compared with the flow of the free edges, whereby the adjacent edges are made to contact and adhere and the strip thus formed is given a spiral shape.

Signed at the city, county and State of New York, this 19th day of May, 1922.

GUIDO TANZI.